July 15, 1958
A. M. KOBLENZ
2,843,749
SYSTEM FOR MEASURING X-RADIATION
Filed Aug. 18, 1955
2 Sheets-Sheet 1
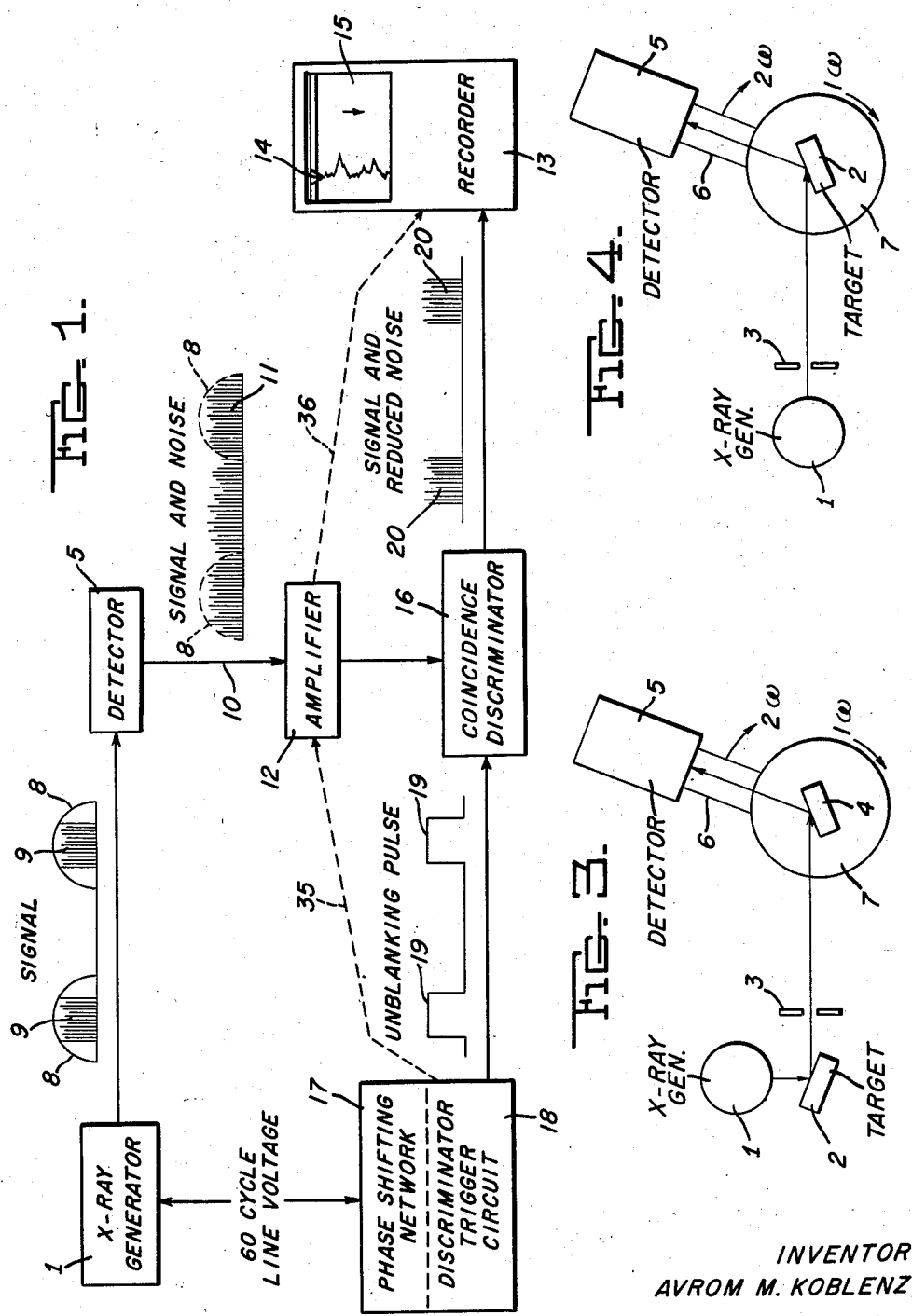
INVENTOR:
AVROM M. KOBLENZ,
BY: Donald G. Dalton
his Attorney.

July 15, 1958 A. M. KOBLENZ 2,843,749
SYSTEM FOR MEASURING X-RADIATION
Filed Aug. 18, 1955 2 Sheets-Sheet 2
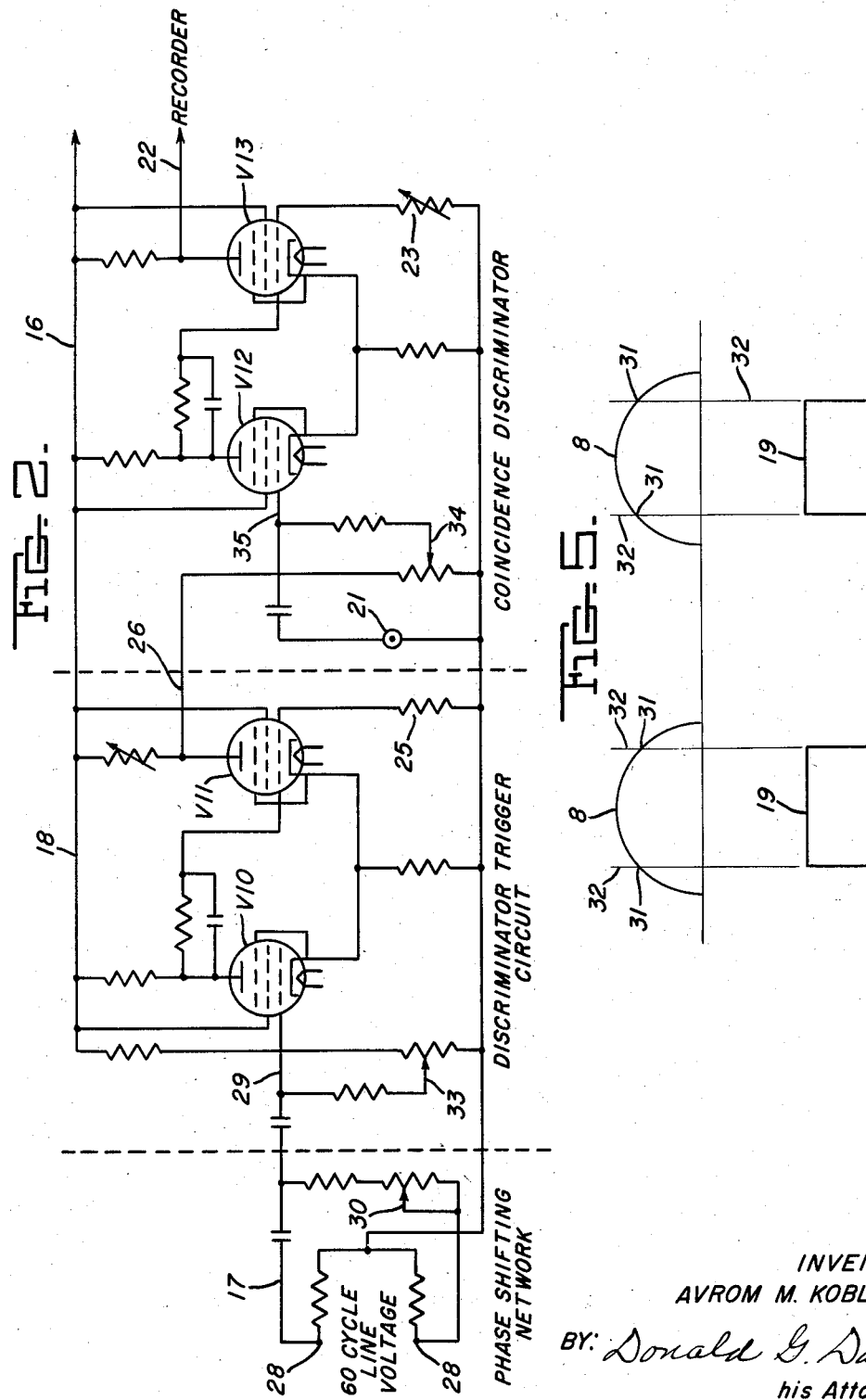
INVENTOR:
AVROM M. KOBLENZ,
BY: Donald G. Dalton
his Attorney.

United States Patent Office 2,843,749
Patented July 15, 1958

2,843,749
SYSTEM FOR MEASURING X-RADIATION

Avrom M. Koblenz, Bayonne, N. J., assignor to United States Steel Corporation, a corporation of New Jersey Application August 18, 1955, Serial No. 529,305

17 Claims. (Cl. 250—52)

This invention relates, as indicated, to a system for measuring X-radiation and is directed to improvements for reducing noise level to thereby provide an improved signal-to-noise ratio in recordations produced by X-ray diffraction and fluorescence apparatus. The improvements of this invention, in a manner to be described, are particularly adaptable to diffraction and fluorescence apparatus employing a half-wave X-ray generator.

In conventional X-ray diffraction apparatus, X-rays directed by a generator against a target or specimen of a material are diffracted into a series of beams of radiation at respectively different angles ($2\theta$) from which are determined the interplanar spacings of the elements or composition of the material being examined. In conventional X-ray fluorescence apparatus, X-rays directed by a generator against a target or specimen of a material cause the elements composing the material to emit characteristic (K-, L-, etc.) radiation which is diffracted by an analyzing or monochromating crystal at respectively different angles ($2\theta$) which are critical for different elements comprising the material. A rotating detector, commonly a Geiger counter, a proportional counter, or the more sensitive scintillation counter, is utilized to detect the angles and intensities of the diffracted radiations. The detector has an output circuit in which pulses are produced at rates varying with the intensity of the radiations received thereby, the pulses produced by a Geiger counter usually having a uniform amplitude while the pulses from a proportional counter or a scintillation counter have an amplitude which varies with the energy of radiation. The detector pulses are amplified and fed to an integrating and recording mechanism which plots on a chart opposite the angle ($2\theta$) of diffracted radiation the intensity of radiation in units designated counts per second. In addition to the diffracted beams of radiation, the detector continuously receives scattered random X-rays, cosmic, and stray room radiation which is recorded as an irregular horizontal base line on the record chart and is generally termed the noise level of the apparatus.

For successful application of X-ray diffraction and fluorescence measurements, it is necessary to be able to distinguish the signal produced by the diffracted radiation from the noise which is continuously recorded by the apparatus. The range of detectable X-rays in conventional apparatus is limited by the characteristics of the detector, the Geiger counter, for example, having a limited range of detectable X-ray wave length radiation between 0.6 Angstroms and 2.7 Angstroms. Short wave length radiation (less than 0.6 Angstroms) is difficult to detect due to the poor absorbing power of the filling gas in the detector, while long wave length radiation (greater than 2.7 Angstroms) is strongly absorbed in the air path and the glass detector window. As the wave length becomes increasingly shorter or longer the signal becomes weaker and cannot be distinguished from the noise. In addition, if the relative amounts of elements or compositions comprising the material being examined are small, the diffracted beams of radiation will be weak in intensity and difficult to distinguish from the noise.

One of the principal objects of this invention is to increase the detectable range of wave length radiation, and this is accomplished in a manner to be described by reducing the noise level of the apparatus. Reducing the noise level provides an improved signal-to-noise ratio and renders visible diffracted signals which would otherwise be lost in the background noise.

Another object of the invention is to provide improvements in an X-ray diffraction and fluorescence counter which render it inoperative to record noise during periods when the X-ray generator is operating at potentials less than that necessary to excite X-radiation which is diffracted by the material being examined in diffraction analysis or to make the elements comprising the material being examined fluoresce and produce characteristic radiation which is then diffracted by the analyzing crystal in fluorescence analysis. In this manner, the counter does not operate to record noise during the time intervals when the potential on the X-ray generator is ineffective to excite the required X-radiation to produce the diffracted beam of radiation and the noise level recorded by the apparatus is thereby decreased considerably. The time intervals when the counter is rendered ineffective include the entire period between successive pulses produced by a half-wave generator and, in both the half-wave and full-wave generators, the time intervals in each pulse of X-rays when the potential is below that necessary to excite the required X-radiation which, in turn, produces the diffracted beam of radiation or signal in diffraction and fluorescence analysis.

A further object of the invention is to provide in combination with an X-ray diffraction and fluorescence apparatus a control circuit operating in synchronism with the pulsing output of an X-ray generator which includes means for rendering the recording provisions of the apparatus inoperative during time intervals when the potential on the X-ray generator is less than a predetermined minimum.

A still further object of the invention is to provide in combination with an X-ray diffraction and fluorescence counter a discriminator type of trigger circuit for producing square-wave control pulses in synchronism with the pulses from the X-ray generator which are employed in conjunction with the pulsing output of a detector to bias the counter to an inoperative condition during the time intervals when the potential on the X-ray generator is less than that effective to excite the required X-radiation to produce the diffracted beams in diffraction analysis and the diffracted beams of characteristic radiation in fluorescence analysis. In a manner to be described, the discriminating trigger circuit of this invention includes means for adjusting the phase relation of its control pulses with respect to the operation of the X-ray generator, and a means for adjusting the relative angular width of each square-wave control pulse so that the diffraction and fluorescence counter is rendered operative for recording purposes only during those periods when the X-rays from the generator are above a predetermined potential. In addition to effecting time discrimination against the recording of noise during periods when the voltage on the X-ray generator is below that required to excite radiations, the discriminating provisions of this invention effect amplitude discrimination, in the case of a detector producing pulses of varying amplitude, against the recording of noise during periods when the voltage on the X-ray generator is sufficient to produce diffracted beams of radiation.

Other objects and advantages of the invention will become apparent from the following description.

In the drawings there is shown a preferred embodiment of the invention. In this showing:

Figure 1 is a block diagram of an X-ray diffraction and fluorescence apparatus and recording counter constructed in accordance with the principles of this invention;

Figure 2 is a circuit diagram of two of the components shown in Figure 1;

Figure 3 is a diagrammatic plan view of a conventional X-ray fluorescence apparatus;

Figure 4 is a diagrammatic plan view of a conventional X-ray diffraction apparatus; and Figure 5 is a diagram showing the angular relation of square-wave control pulses with respect to X-ray pulses from a half-wave generator.

As indicated above, the improvements of this invention are applicable to X-ray apparatus of the fluorescence and diffraction types shown respectively in Figures 3 and 4. Figure 3 illustrates diagrammatically a conventional arrangement of apparatus for effecting fluorescence measurements of a material to be examined. In this showing, the numeral 1 designates an X-ray generator tube for directing X-radiations against a target 2 of a material to be examined. When the target 2 is excited to a state of fluorescence, secondary beams of X-radiations, characteristic of the elements comprising the material of the target 2, pass through an aperture in a shield 3 and are diffracted by a monochromating crystal 4 to a detector 5 which may be of any suitable type such as a Geiger counter, a proportional counter, or a scintillation counter. The detector 5 is mounted on an arm 6 which is rotated at twice the rotational speed of the table 7 in such manner that the relative angular position of the arm 6 indicates the critical angle ($2\theta$) at which characteristic radiations are diffracted by the analyzing or monochromatic crystal. Diffracted radiations and noise due to stray room and cosmic energy received by the detector 5 are converted into electrical pulses which are amplified and recorded by a pulse counter in a conventional manner.

Figure 4 illustrates diagrammatically a conventional arrangement of apparatus for effecting diffraction measurements of a material to be examined and, in this showing, like parts are designated by the same numerals employed in connection with the description of Figure 3. In the apparatus shown in Figure 4, X-radiations from the X-ray generator tube 1 are directed through the aperture in the shield 3 against the target 2 which is mounted directly on the table 4 for rotation therewith. The X-radiations from the tube 1 are diffracted by the materials comprising the target 2 and are received by the detector 5. As in the apparatus of Figure 3, the relative angular position of the detector 5 indicates the critical angle ($2\theta$) at which X-radiations are diffracted by the target 2. Such diffracted radiations and the noise due to stray room and cosmic energy received by the detector 5 are converted into electrical pulses which are amplified by a pulse counter in a conventional manner.

In each type of conventional apparatus shown respectively in Figures 3 and 4, the energy received by the detector 5 is a diffracted signal in the form of diffracted radiation which is excited by X-ray energy from the generator 1 and which emanates from the target 2. In the case of the fluorescence apparatus of Figure 3, diffraction is effected by the crystal 4 and, in the case of the diffraction apparatus of Figure 4, diffraction is effected directly by the material of the target 2. Accordingly, it would be understood that the terms "diffracted radiation" or "diffracted signal" as used herein are intended to define in a generic sense the energy which is received and measured by the detector 5 without regard to the type of apparatus producing such energy.

As indicated above, this invention is particularly adapted for use with a half-wave X-ray generator producing the desired X-radiation only when the sinusoidal voltage as indicated by the numeral 8 in Figure 1 on the generator reaches the desired voltage level and wherein the generator 1 and detector 5 of Figures 3 and 4 are shown diagrammatically. In this showing, the vertical lines 9 indicate the signal diffracted from the target in diffraction and from the analyzing crystal in fluorescence to the detector 5 and, since the signal is not produced until the voltage is sufficient to excite the desired radiations, it will be noted that a diffracted signal 9 is produced during only a portion of the angular length of each voltage half-cycle 8. The detector 5 has an output circuit 10 which is energized or pulsed at a rate varying with the intensity of the diffracted signals and the stray radiation or noise received thereby and produces a combined noise and radiation signal designated 11 which is comprised of a series of consecutive pulses. The relative time positions of the voltages 8 have been shown in dotted lines over the output signal 11 and it will be noted that the signal 11 is continuous over the length of each voltage 8 and the half-cycle gap between successive voltages 8. A pulse amplifier 12 receives and amplifies the signal 11 to a value sufficient to operate a recording counter. The amplifier 12 is preferably constructed as explained in the 1949 edition of "Electronics" by Elmore and Sands at page 58 et seq.

In conventional apparatus, the signal 11, after amplification, is fed from the amplifier 12 to an integrating recorder 13. The integrating recorder 13 actuates a marking pen 14 transversely on a chart 15 moving in the direction indicated by the arrow to produce a record of the rate of signal pulses being fed to the recorder 13. The movement of the chart 15 is related to the angular movement of the detector 5 so that the length of the line marked thereon indicates the angle ($2\theta$) of diffracted radiation, the transverse position of the line and the peaks therealong furnishing an indication of the intensity of the radiation being recorded which is designated in conventional units of counts per second. The record produced on the chart 15 thus corresponds to the composite signal 11 transmitted to the recorder 13 which, of course, includes all of the noise received by the detector 5 in the time intervals when the voltage 8 is insufficient to produce desired diffracted radiation.

As distinguished from conventional arrangements, noise is excluded from the recorder 13 during the time intervals when the X-ray voltage is below that required to excite desired X-radiation, and, in apparatus using a scintillation counter as the detector 5, at least a portion of the noise is excluded during periods when diffracted radiations are being received. To this end, the amplifier 12 in accordance with the principles of this invention is connected with the recorder 13 through a coincidence discriminator circuit 16 which is periodically rendered operative to transmit energy by a control circuit including a phase shifting network 17 and a discriminator trigger circuit 18. The trigger circuit 18 is a square-wave generator and delivers unblanking or control pulses 19 to the discriminator circuit 16 which in a manner to be described is normally biased to cut-off and is rendered conductive by the combined action of the pulses 19 and portions of the signals 11 occurring during corresponding time intervals of diffracted signals 9. When the discriminator circuit 16 is rendered conductive, an amplified portion of the signal 11 corresponding to the energy derived from a diffracted signal 9 is transmitted to the recorder 13 in the form of pulses 20. Each of the pulses 20 is of course comprised of a plurality of detector pulses which vary in number with the intensity of the diffracted signal 9. In this manner, transient or background noise in the intervals between successive diffracted signals 9 is withheld from the recorder 13, the unit 16 in effect operating to discriminate against the transmission of background noise during such intervals.

As shown in the wiring diagram of Figure 2, the coincidence discriminator circuit 16 and discriminator trigger circuit 18 are each a biased Schmitt Trigger Circuit of the type described in detail at pages 99 and 202 of the above-mentioned publication "Electronics." Since these circuits are conventional, a specific description of the circuit elements is unnecessary and a general explanation will be sufficient to afford an understanding of the respective circuit operations to the end of effecting a reduction in the noise transmitted to the recorder 13.

The pulse amplifier 12 is connected through an input tap 21 with the circuit 16 which in a manner to be described operates to transmit selected portions of the amplified signal 11 through an output lead 22 to the recorder 13 under conditions determined by the biasing voltages applied to the grids of a pair of tubes V12 and V13. As in the Schmitt Trigger Circuit, the biasing voltages on the grids of the tubes V12 and V13 place them in a normal condition with tube V12 cut-off and tube V13 conducting and, under this condition, no output signal will appear in the output lead 22. This condition is maintained as long as the bias on V12 is below a critical bias on V13 determined by the setting of resistor 23. When the bias on V12 is changed to a value substantially that of the critical bias on V13, tube V12 begins to conduct and a regenerative condition develops with V12 drawing current from V13 which triggers the circuit to a new condition with V12 conducting and V13 cut-off. The new condition is maintained until the bias on V12 drops below the critical value of the bias on V13 at which time the circuit reverts to its original state with V12 cut-off and V13 conducting. The output signal over the lead 22 is a square wave pulse having a time duration equal to the time the circuit is in the new state. Operation of the discriminator circuit 16 is controlled by the combined action of the signal 11 and a square wave pulse from the trigger circuit 18 which are impressed on the grid of the V12 in a manner to be described such that time and amplitude discriminations are applied to the amplified signal 11 received at the input tap 21, the time and amplitude discriminations being effective to reduce the transmission of background noise to the recorder 13.

The trigger circuit 18 comprises a pair of tubes V10 and V11 arranged and normally biased as in a Schmitt Trigger Circuit with the tube V11 conducting and the tube V10 cut-off. The critical bias on V11 is determined by resistor 25 and, when the bias on the grid of V10 approaches this critical valve, tube V10 begins to conduct and a regenerative condition develops with V10 drawing current from V11 which triggers the circuit to a new condition with V10 conducting and V11 cut-off and which will be maintained until the bias on V10 drops below the critical bias on V11 as determined by resistor 25 when the circuit will revert to its original state with V10 cut-off and V11 conducting. When V10 is conducting and V11 is cut-off, a square wave pulse 19 appears in lead 26 which has a time duration equal to the time the circuit is in this condition.

As indicated above, the square wave pulses 19 are generated at a frequency and have a time duration corresponding to the frequency and time duration of the diffracted radiations 9. The pulse generating operation of the trigger circuit 18 is controlled by the phase shifting network 17 which, being energized at the taps 28 by the same 60 cycle line voltage energizing the X-ray generator 1, delivers the 60 cycle voltage to the grid lead 29 for the tube V10 at the same frequency and with the same phase as that of the X-ray voltage 8. The circuit 17 includes an adjustable resistor 30 for synchronizing the angular phase relationship of the 60 cycle voltage supplied to lead 29 with respect to the X-ray voltage 8.

It will be recalled that desired diffracted radiations 9 are not produced until the X-ray voltage 8 is above a minimum which is determined by the element or composition effecting the diffracted radiation. In this respect, in fluorescence analysis it is necessary that the voltage 8 on the X-ray generator be at least equal to the energy of the characteristic radiation of the element being examined. For example, to excite the K-alpha radiation of copper having a wave length, lambda, of 1.54 Angstroms, the voltage on the X-ray tube must be at least 8000 volts which is the excitation voltage of the copper K-alpha radiation. During the portion of each voltage 8 when the voltage on the X-ray tube is below this minimum, characteristic radiations will not be generated. In diffraction analysis it is necessary that the voltage 8 on the X-ray generator be great enough to produce the desired X-radiation which is determined by the element comprising the anode of the X-ray tube itself. For example, if the X-radiation of an X-ray tube with a molybdenum anode is to be used to study the element or composition comprising the material or target, the voltage on the X-ray tube must be at least 17,500 volts to excite the characteristic K-alpha radiation of molybdenum and, during the portion of each voltage 8 when the voltage is below this minimum, the desired radiations which are diffracted by the material to be studied will not be produced. Referring to the diagrammatic showing of the voltage 8 in Figure 5, and assuming the point 31 represents the potential at which characteristic radiaations are excited, it will be apparent that radiations are excited, it will be apparent that radiations are had during the portion of the voltage 8 between the vertical lines 32 and that the time interval represented by the distance between such lines is less than the time interval of each voltage 8. It will also be recalled that generation of a square wave pulse 19 is not initiated by the circuit 18 until the bias on V10 equals that on V11. A potentiometer 33 is provided for supplying the grid of V10 with a steady biasing voltage. When the positive half-cycle voltages on the grid lead 29 from the circuit 17 and the steady biasing voltage from the potentiometer 33 provide a bias on V10 equalling that on V11, generation of a square wave pulse 19 is initiated. By adjusting the potentiometer 33, the beginning and end of each pulse 19 is made to fall on the lines 32 and thus coincide with the beginning and end of diffracted radiations 9. In this manner, pulses 19 are generated which are of the same time duration and synchronous in phase with the portion of each X-ray voltage 8 during which diffracted radiation is being produced.

The square wave pulses 19 from the trigger circuit 18 are utilized to render the discriminator circuit operative to transmit over the lead 22 to the recorder 13 portions of the signal 11 corresponding in point of time to those occasioned by diffracted radiation pulses 9. To this end, potentiometer 34 connects the lead 26 with the grid lead 35 for the tube V12 which is also connected with the input tap 21 for the signal 11. In this manner, the bias on the tube V12 is determined by the combined action of the signal 11 and the square wave pulses 19 generated by the trigger circuit 18. Recalling that the tube V12 is normally cut-off, it will be apparent that it will not be rendered conductive and operative to pulse the recorder output lead 22 unless the bias from the signal 11 and square wave pulses 19 equals the bias on the tube V13. If the critical voltage on the grid of V13 is +100 volts, the bias on the grid of V12 must be raised to at least +100 volts for an output pulse to be produced in recorder lead 22. In the case of a scintillation counter as the detector 5 which provides pulses of varying amplitude in the output circuit 10 and assuming that most of the signal and noise pulses in the amplified signal 11 impressed on the grid lead 35 are respectively of the order of about +30 volts and +20 volts, these voltages will not trigger the circuit 16. However, if the potentiometer 34 is adjusted so that the unblanking pulses 19 impressed on the grid lead 35 have an amplitude of +75 volts, then for the period of time that it is present on the grid V12, the signal pulses will trigger the circuit. However, the circuit will not be triggered by noise pulses which are of smaller amplitude.

Since the circuit 16 can only be triggered when a square wave control pulse is on the grid lead 35, it will be apparent that the circuits 16 and 18 provide a time discrimination against the transmission of pulses during the periods when the X-ray voltage 8 is less than that required to excite characteristic radiations. In other words, the transmission of noise is suppressed during the periods between diffracted radiations 9 which are produced only during a predetermined portion of every cycle. The time discrimination thus permits information to be recorded only during the portion of the cycle when the signal 9 is being generated.

In addition, the circuit 16 effects an amplitude discrimination against its being triggered by noise pulses during those periods when the presence of a control pulse 19 on the grid lead 35 renders it capable of being triggered. As explained above, and assuming the control pulses 19 have an amplitude of 75 volts and a bias of 100 volts is required to trigger the circuit 16, it will be apparent that noise pulses having an amplitude of less than 25 volts during the presence of a control pulse 19 will be ineffective to trigger the circuit 16. In this manner, the majority of noise pulses are discriminated against while most of the signal pulses, being of a greater amplitude, are not affected.

From the foregoing, it will be apparent that the combined action of the circuits 16 and 18 is effective to eliminate the transmission of noise during the intervals between successive control pulses 19, and, during the existence of a control pulse 19, is effective to eliminate those noise pulses having an amplitude smaller than that required to trigger the circuit 16 as determined by the setting of the resistor 23 and the resulting bias applied to the tube V13. While the transmission of noise is not entirely eliminated since strong noise pulses can and will trigger the circuit 16, the noise level recorded on the chart 15 is considerably lower than that in conventional apparatus without the time and amplitude discrimination provided by the circuits 16 and 18 of this invention. The reduction in noise level provided by the circuits 16 and 18 thus makes it possible to distinguish weak signals on the chart 15 which would otherwise be lost in the background noise and at the same time increases the effective range of the detector 5 whether it be a Geiger counter, proportional counter, or scintillation counter. As has been indicated above, conventional detectors have a limited range of X-ray wave length detection since the signals at the upper and lower limits become weaker and unidistinguishable from noise. By decreasing the noise, the effective range of the detector is increased.

Conventional recording apparatus, such as that designated in Figure 1 by the numerals 13, 14 and 15, records the strength of the signals received in units designated counts per second. Since the recorded count for any given signal statistically fluctuates between plus or minus the square root of $n$, where $n$ is the rate of counts per second, it will be apparent that the record produced on the chart 15 will not be a straight line but will be comprised of a plurality of maximum peaks having a difference of approximately twice the square root of $n$. For example, if the background noise is at an average rate of about 25 counts per second, the record on the chart 15 may vary between a maximum count of 30 and a minimum count of 20. Under this condition, and if a weak signal, effective, for example, to produce a count of 35 is received, it may be impossible to determine the presence of the signal since it will have a minimum signal count of approximately 29 which is less than the maximum count for the background noise and the presence of the signal cannot be accurately determined. However, by reducing the background count in accordance with the principles of this invention to an average rate of about 15 C./S. so that it has a maximum of 19 C./S. and a minimum of 11 C./S., the presence of signals having an average rate of 35 and less can be determined without question.

The examples of test data listed below illustrate the improved results obtained by the use of the circuits 16 and 18 of this invention. In obtaining the test data for each of these examples, a scintillation counter was used as the detector 5 and the operative condition of the circuits 16 and 18, which are designated by the term "noise reducer," is indicated as being "off" and "on." In each case, the data under the headings background and signal gives the total number of counts recorded and the time in seconds from which the rate in counts per second (C./S.) was calculated.

*Example 1*

Fe K-alpha radiation, $2\theta = 41.5°$.
Energy of characteristic Fe K-alpha radiation—6.4 kv.

| Noise Reducer | Background | Signal |
|---|---|---|
| Off | $8{,}192/360 = 22.7 \pm \sqrt{22.7}$ C./S | $\frac{20{,}480}{34} = 603 \pm \sqrt{603}$ C./S. |
| On | $8{,}192/770 = 10.6 \pm \sqrt{10.6}$ C./S | $\frac{20{,}480}{34.6} = 592 \pm \sqrt{592}$ C./S. |

*Example 2*

Ti K-alpha radiation, $2\theta = 58.3°$
Energy of characteristic Ti K-alpha radiation—3.5 kv.

| Noise Reducer | Background | Signal |
|---|---|---|
| Off | $4{,}096/65 = 63.0 \pm \sqrt{63.0}$ C./S | $\frac{20{,}480}{55.5} = 370 \pm \sqrt{370}$ C./S. |
| On | $4{,}096/133 = 30.8 \pm \sqrt{30.8}$ C./S | $\frac{20{,}480}{62} = 330 \pm \sqrt{330}$ C./S. |

*Example 3*

Ca K-alpha radiation, $2\theta = 73.2°$
Energy of characteristic Ca K-alpha radiation—3.68 kv.

| Noise Reducer | Background | Signal |
|---|---|---|
| Off | $4{,}096/55 = 74.5 \pm \sqrt{74.5}$ C./S | $\frac{20{,}480}{68} = 304 \pm \sqrt{304}$ C./S. |
| On | $4{,}096/83 = 49.3 \pm \sqrt{49.3}$ C./S | $\frac{20{,}480}{74} = 277 \pm \sqrt{277}$ C./S. |

*Example 4*

Ca K-beta radiation, $2\theta = 66.3°$
Energy of characteristic Ca K-beta radiation—4.00 kv.

| Noise Reducer | Background | Signal |
|---|---|---|
| Off | $4{,}096/157 = 26.0 \pm \sqrt{26}$ C./S | $\frac{20{,}480}{57.0} = 36 \pm \sqrt{36}$ C./S. |
| On | $4{,}096/292 = 14.0 \pm \sqrt{14.0}$ C./S | $\frac{20{,}480}{70.0} = 30 \pm \sqrt{30}$ C./S. |

Example 4 clearly shows the improvements resulting from a reduction of noise background by the provision of the circuits 16 and 18. The radiation of the Ca K-beta line is weak in intensity and difficult to distinguish between the signal and background noise. With the noise reducing circuits 16 and 18 turned off, and bearing in mind that the rate of count statistically varies between plus and minus the square root of the rate, it will be apparent that the maximum background count is $26 + \sqrt{26}$ or 31 C./S. while the minimum signal count is $36 - \sqrt{36}$ or 30 C./S. so that it is impossible to determine without question whether the information recorded is the result of background noise or a diffracted signal. With the circuits 16 and 18 turned on, the noise is reduced to 14 C./S. thus giving a maximum background count of about 17.5 C./S. while the minimum signal count is 30—√30 or 24.5 C./S. and there is no question but that the information recorded is the result of a signal.

The first three examples illustrate that the noise reducer of this invention provides a greater difference between the signal count and noise count and the advantages of the invention in this respect will be apparent to operators of diffraction and fluorescence apparatus.

While the apparatus of this invention is particularly applicable to and the above description is specific to half-wave X-ray generators in that it eliminates all noise between successive voltage 8, it will be understood that the principles of the invention are applicable to full wave X-ray generators where there is no half-cycle spacing between successive voltage 8. In the case of full wave generators, the circuit 17 would be modified to provide a triggering pulse to the circuit 18 synchronously and in phase with the voltage on the X-ray generator, and the circuits 16 and 18 would continue to operate as described above to eliminate noise in the intervals when the X-ray voltage is below that required to excite radiation signals 9.

Because of its amplitude discriminating characteristics, the circuit 16 is particularly adapted for use with apparatus employing a scintillation counter or a proportional counter as the detector 5 which, as explained above, has an output of pulses of an amplitude varying with the energy of radiation received. In such case, the circuit 16 effects, as also explained above, an amplitude discrimination which eliminates noise pulses of small amplitude during those periods when a triggering pulse 19 is present on the control grid of the tube V12. While the circuits 16 and 18 may be employed when a Geiger counter is used as a detector 5, the amplitude discrimination of the circuit 16 is not required since the pulsing output of a Geiger counter has a substantially constant amplitude, the signal and noise pulses being identical. Accordingly, it will be understood that the circuit 16 may be omitted when a Geiger counter is used as the detector 5. In such case, one of the stages in the amplifier 12 will be biased normally to cut-off and the trigger circuit 18 will be connected with the amplifier 12 as indicated diagrammatically by the broken line 35 in such manner that the control pulses 19 are effective to remove the cut-off bias on the amplifier 12 and render it conductive during intervals corresponding to the time duration of the pulses 19. With this arrangement, the amplifier 12 will be connected directly with the recorder 13 as indicated diagrammatically by the broken line 36 so that it will be effective to record pulses during the time intervals determined by the presence of control pulses 19. During the intervals between pulses 19, this arrangement will effect a time discrimination against the recording of noise occurring in periods when the voltage on the X-ray tube is below that required to produce the signal.

While the circuits 16 and 18 are conventional and are preferably of the type described in the above mentioned publication "Electronics," it will be understood that the use of other conventional and equivalent circuits is contemplated for the purposes of this invention.

While one embodiment of my invention has been shown and described it will be apparent that other adaptations and modifications may be made without departing from the scope of the following claims.

I claim:

1. In a system for measuring X-radiations, means for producing diffracted radiations including generator means subject to varying voltage for directing X-ray energy against a target of a material to be examined, detector means for receiving said diffracted radiations and for producing an energizing force proportional to the energy of the radiations received thereby, a recording unit operated by said energizing force, and means operating synchronously and in phase with said X-ray energy for rendering said recording unit operative when the voltage on said generator means is above a predetermined minimum sufficient to produce said diffracted radiations and for rendering said recording unit inoperative when the voltage on said generator means is below said minimum.

2. In a system for measuring X-radiations, means for producing diffracted radiations including generator means subject to varying voltage for directing X-ray energy against a target of a material to be examined, detector means for receiving said diffracted radiations and for producing an energizing force proportional to the energy of the radiations received thereby, a recording unit, means for operating said recording unit including circuit means for transmitting said energizing force thereto, and means operating synchronously and in phase with said X-ray energy for rendering said circuit means operative when the voltage on said generator means is above a predetermined minimum sufficient to produce said diffracted radiations and for rendering said circuit means inoperative when the voltage on said generator means is below said minimum.

3. In a system for measuring X-radiations, means for producing diffracted radiations including generator means subject to varying voltage for directing X-ray energy against a target of a material to be examined, a detector for receiving said diffracted radiations and for producing electrical pulses at rates varying with the intensity of the diffracted radiations received thereby, a mechanism for counting and recording said detector pulses, and means operating synchronously and in phase with said X-ray energy for rendering said mechanism operative to count said pulses when the voltage on said generator means is above a predetermined minimum sufficient to produce said diffracted radiations and for rendering said mechanism inoperative when the voltage on said generator means is below said minimum.

4. In a system for measuring X-radiations, means for producing diffracted radiations including generator means subject to varying voltage for directing X-ray energy against a target of a material to be examined, a detector for receiving said diffracted radiations and for producing electrical pulses at rates varying with the intensity of the diffracted radiations received thereby, a mechanism for counting and recording said detector pulses, circuit means for conducting said detector pulses to said mechanism for a counting and recording operation thereby, and means operating synchronously and in phase with said X-ray energy for rendering said circuit means operative when the voltage on said generator means is above a predetermined minimum sufficient to produce said diffractured radiations and for rendering said circuit means inoperative when the voltage on said generator means is below said minimum.

5. In a system for measuring X-radiations, means for producing diffracted radiations including a half-wave generator for directing on alternate half-cycle intervals of time X-ray energy against a target of a material to be examined, a detector for receiving said diffracted radiations and for producing electrical pulses at rates varying with the intensity of the diffracted radiations received thereby, a mechanism for counting and recording said detector pulses, circuit means for conducting said detector pulses to said mechanism for a recording and counting operation thereby, and means operating synchronously and in phase with said X-ray energy for rendering said circuit means operative during said alternate half-cycle intervals of time.

6. A system as defined in claim 5 characterized by said circuit means including a biasing circuit normally biased to cut-off and rendering it inoperative, and said synchronously operating means comprising a square-wave generator means for producing control pulses in phase with said X-ray energy and for applying said control pulses to said biasing circuit to remove said cut-off bias and render said circuit means operative.

7. A system as defined in claim 6 characterized by said generator being subject to a varying voltage and by the provision of means for adjusting the angular width of said control pulses to render said circuit means operative only during the portions of said alternate half-cycle intervals of time when the voltage on said generator is sufficient to produce said diffracted radiations.

8. In a system for measuring X-radiations, means for producing diffracted radiations including generator means subject to varying voltage for directing X-ray energy against a target of a material to be examined, a detector for receiving said diffracted radiations and for producing electrical pulses at rates varying with the intensity of the diffracted radiations received thereby, a mechanism for counting and recording said detector pulses, circuit means for conducting said detector pulses to said mechanism for a recording and counting operation thereby, biasing means normally biasing said circuit means to cut-off and rendering it inoperative, a square wave generator for producing control pulses synchronously and in phase with the X-ray energy from said generator, and means for applying said control pulses to said circuit means to remove said cut-off bias and render it operative.

9. A system as defined in claim 8 characterized by said square-wave generator being provided with phase shifting means for adjusting the angular phase relation of its control pulses with respect to said generator X-ray energy.

10. A system as defined in claim 8 characterized by said square-wave generator being provided with means for adjusting the angular width of said control pulses.

11. In a system for measuring X-radiations, means for producing diffracted radiations including generator means subject to varying voltage for directing X-ray energy against a target of a material to be examined, a detector for receiving said diffracted radiations and for producing electrical pulses at rates varying with the intensity of the diffracted radiations received thereby, a mechanism for counting and recording said detector pulses, and means controlling the transmission of said detector pulses to said recording mechanism comprising a biasing control circuit normally biased to cut-off and preventing the transmission of detector pulses, a square-wave generator for producing control pulses synchronously and in phase with said X-ray energy, and a circuit connection between said square-wave generator and said biasing control circuit for applying said control pulses to render said biasing control circuit conductive and thereby to effect transmission of said detector pulses to said recording mechanism.

12. In a system for measuring X-radiations, means for producing diffracted radiations including generator means subject to varying voltage for directing X-ray energy against a target of a material to be examined, a detector for receiving said diffracted radiations and for producing electrical pulses at rates varying with the intensity of the diffracted radiations received thereby, a mechanism for counting and recording said detector pulses, and means controlling the transmission of said detector pulses to said recording mechanism comprising a biasing control circuit normally biased to cut-off and preventing the transmission of detector pulses, a connection for conducting said detector pulses to said biasing circuit, and a trigger circuit comprising a square-wave generator for producing and delivering control pulses synchronously and in phase with said X-ray energy to said biasing circuit to render it conductive when the combined voltage of said detector pulses and control pulses overcomes the cut-off bias thereon.

13. In a system for measuring X-radiations, means for producing diffracted radiations including generator means subject to varying voltage for directing X-ray energy against a target of a material to be examined, a detector for receiving said diffracted radiations and for producing electrical pulses of a frequency and amplitude varying with the intensity of the diffracted radiations received thereby, an output circuit to which said detector transmits said electrical pulses, a counter for recording said detector pulses, a discriminator circuit for connecting said detector output circuit with said counter and having a biasing circuit rendering it normally inoperative, a trigger circuit for generating square-wave control pulses in phase with said generator X-ray energy, and means responsive to the combined potential of said control pulses and said output circuit pulses for removing the bias on said biasing circuit to render said discriminator circuit operative.

14. An apparatus as defined in claim 13 characterized by said discriminator circuit comprising a pair of regeneratively coupled vacuum tubes, one of said tubes having a predetermined bias and being normally conducting and the other of said tubes having a steady bias less than said predetermined bias and being normally cut-off, and said responsive means being operative to apply the combined potential of said output and control pulses for triggering said other tube to a conducting condition and said one tube to cut-off whereby said discriminator circuit is rendered operative to transmit said detector output circuit control pulses to said recorder.

15. An apparatus as defined in claim 14 characterized by the provision of means for varying the predetermined bias on said one tube to thereby effect an amplitude discrimination against the detector output pulses applied to said other tube.

16. An apparatus as defined in claim 14 characterized by the provision of means for varying the amplitude of said control pulses to thereby effect an amplitude discrimination against the detector output pulses applied to said other tube.

17. An apparatus as defined in claim 14 characterized by the provision of means for varying the amplitude discrimination against the detector output pulses applied to said other tube.

References Cited in the file of this patent

UNITED STATES PATENTS

| | | |
|---|---|---|
| 2,476,150 | Koppius | July 12, 1949 |
| 2,648,011 | Good | Aug. 4, 1953 |
| 2,750,513 | Robinson et al. | June 12, 1956 |
| 2,755,389 | Jones et al. | July 17, 1956 |

UNITED STATES PATENT OFFICE
CERTIFICATE OF CORRECTION

Patent No. 2,843,749                                                           July 15, 1958

Avrom M. Koblenz

It is hereby certified that error appears in the printed specification of the above numbered patent requiring correction and that the said Letters Patent should read as corrected below.

Column 8, line 30, Example 2, for "3.5 kv." read --4.5 kv.--.

Signed and sealed this 7th day of October 1958.

(SEAL)

Attest:
KARL H. AXLINE

Attesting Officer

ROBERT C. WATSON
Commissioner of Patents